United States Patent
Yaeger et al.

(10) Patent No.: US 8,440,290 B2
(45) Date of Patent: May 14, 2013

(54) CONTACT MEDIA FOR EVAPORATIVE COOLERS

(75) Inventors: Ronald James Yaeger, Dallas, TX (US); Galen W. Hartman, Kemp, TX (US)

(73) Assignee: Anne Yaeger, Dallas, TX (US)

( * ) Notice: Subject to any disclaimer, the term of this patent is extended or adjusted under 35 U.S.C. 154(b) by 0 days.

(21) Appl. No.: 13/545,695

(22) Filed: Jul. 10, 2012

(65) Prior Publication Data

US 2013/0001812 A1     Jan. 3, 2013

Related U.S. Application Data

(63) Continuation-in-part of application No. 10/828,893, filed on Apr. 20, 2004, now abandoned, which is a continuation-in-part of application No. 10/007,976, filed on Nov. 13, 2001, now abandoned, which is a continuation-in-part of application No. 09/426,228, filed on Oct. 22, 1999, now abandoned.

(51) Int. Cl.
*B32B 3/30*     (2006.01)

(52) U.S. Cl.
USPC ............. 428/182; 442/59; 442/153; 442/172; 442/180

(58) Field of Classification Search ............... 428/182; 442/59, 153, 172, 180
See application file for complete search history.

(56) References Cited

U.S. PATENT DOCUMENTS

| | | | |
|---|---|---|---|
| 3,262,682 A | 7/1966 | Bredberg |
| 3,307,617 A | 3/1967 | Munters |
| 3,493,461 A | 2/1970 | Sterman et al. |
| 3,792,841 A | 2/1974 | Munters |
| 3,798,057 A | 3/1974 | Polovina |
| 3,862,280 A | 1/1975 | Polovina |
| 4,702,947 A | 10/1987 | Pall et al. |
| 5,068,142 A | 11/1991 | Nose et al. |
| 5,260,117 A | 11/1993 | Myers et al. |
| 5,560,796 A | 10/1996 | Yoshimura |
| 5,571,551 A | 11/1996 | Fusi et al. |
| 6,228,506 B1 | 5/2001 | Hosatte et al. |
| 6,503,629 B2 | 1/2003 | Nishiguchi et al. |
| 6,585,989 B2 | 7/2003 | Herbst et al. |
| 2002/0136885 A1 | 9/2002 | Yaeger et al. |
| 2005/0001339 A1 | 1/2005 | Yaeger et al. |

FOREIGN PATENT DOCUMENTS

WO     91/03378 A1     3/1991

*Primary Examiner* — Elizabeth Cole
(74) *Attorney, Agent, or Firm* — Chainey P. Singleton; Chalker Flores, LLP

(57) ABSTRACT

The present invention includes a contact medium for use in an evaporative cooler, comprising a corrugated fibrous sheet material comprising at least a top layer and a bottom layer in contact at one or more regions to form at least two channels between the top layer and the bottom layer for air and fluid flow; and a water insoluble thermoplastic compound that impregnates the corrugated fibrous sheet material. The water insoluble thermoplastic compound may have between 1-35 weight percent PVC; 1-20 weight percent PAN; 1-60 weight percent PMA; 1-20 weight percent PAI; and 2-25 weight percent PBA. For example, the composition may have about 2 weight percent PVC; 18 weight percent PAN; 45 weight percent PMA; 15 weight percent PAI; and 20 weight percent PBA.

20 Claims, 3 Drawing Sheets

CONTACT MEDIA FOR EVAPORATIVE COOLERS

CROSS-REFERENCE TO RELATED APPLICATIONS

This application is a continuation-in-part of co-pending application Ser. No. 10/828,893, filed on Apr. 20, 2004, which is a continuation-in-part of application Ser. No. 10/007,976, filed on Nov. 13, 2001, which in turn is a continuation-in-part of application Ser. No. 09/426,228, filed on Oct. 22, 1999, the contents of each of which are incorporated herein by reference.

STATEMENT OF FEDERALLY FUNDED RESEARCH

None.

INCORPORATION-BY-REFERENCE OF MATERIALS FILED ON COMPACT DISC

None.

TECHNICAL FIELD OF THE INVENTION

This invention relates in general to gas/liquid contact media. In particular, the invention relates to contact media for use in evaporative cooling equipment using water having dissolved and particulate contaminants.

BACKGROUND OF THE INVENTION

Without limiting the scope of the invention, its background is described in connection with evaporative coolers are a popular choice for HVAC (heating/venting/air conditioning) service, especially in dry climates, as they can simultaneously cool and humidify the air, and do so with considerably less electrical power consumption than conventional refrigerant systems using fluorocarbon refrigerants. However, evaporative coolers have several problems not present with refrigerant systems, including scale build-up and the growth of mold, algae and other microbes. These problems require regular maintenance, adding to the cost of operation. The added cost of maintenance in some cases can outweigh the cost benefit of lower electrical consumption.

Water used in evaporative coolers ordinarily contains dissolved minerals such as carbonates, sulfates, and nitrates of calcium, magnesium, potassium and sodium, which deposit on the contact media as scale. As the water evaporates, the concentration of dissolved minerals increases, causing more rapid scale build-up on the contact media and the formation of particulates in the water. Scale tends to reduce the evaporative efficiency of the contact media, and will eventually clog the passages through which the water and air pass, further reducing evaporator efficiency. Moreover, the added weight from the scale deposits can cause deformation or collapse of insufficiently supported media. Depending on the makeup of ionic material dissolved in the water, the water may become acidic or alkaline, which can to also promote deterioration of the contact media. Mold, algae and mildew can also develop that attack the contact media, create objectionable odors and present a potential health hazard.

Several methods have been used to address the problems of scale build-up on the contact media: 1) use of once-through water or use of recirculating water with a high bleed-off water rate to reduce the concentration of dissolved salts; 2) addition of scale inhibiting chemicals to the recirculated water; and 3) use of untreated recirculated water without bleed-off, along with periodic replacement of the contact media. All of these methods add to the operating and maintenance costs. If a replaceable contact media can be made that is long lasting and inexpensive however, the third method becomes attractive.

Replaceable contact media has been made with cellulose, asbestos, or fiberglass sheets. These materials are preferred for their large effective surface area and good wetting properties, which promotes greater evaporation rates for a given amount of material. However, materials having these desired properties often also lack the needed rigidity and water resistance to hold up under typical service for extended periods.

To improve the longevity of the contact media, it is common to impregnate the bulk material with a polymer material. Impregnation can increase the overall structure's strength, especially when wet, and thereby increase its durability and resistance to deformation caused by scale build-up. Different organic and inorganic materials have been used, with organic polymers being a popular choice.

U.S. Pat. No. 3,262,682, issued to Bredberg and U.S. Pat. No. 3,792,841, issued to Munters, teach impregnating cellulose or asbestos sheets with either a phenolic aldehyde resin or a phenolic resin to increase wet strength. Other polymers commonly used in the industry are urea formaldehyde, melamine, and melamine formaldehyde, all of which are thermosetting plastics that are cured on the bulk material. Unfortunately, these polymers tend to break down under contact with acidic or alkaline recirculated water, hydrolyzing back into the original reactants and other smaller compounds that dissolve and are washed away, leaving the bulk material unprotected and unsupported. Some of the hydrolysis products are volatile and will vaporize and be blown into the ventilation ducting along with the cooled air, polluting the air in the living space. The remaining, environmentally harmful hydrolysis products remain dissolved in the water, and are usually dumped into the local water table when the cooler is flushed out, because the environmental hazard created by this type of contact media is not generally recognized.

U.S. Pat. No. 3,798,057 and U.S. Pat. No. 3,862,280, both issued to Polvina, disclose the use of a special bulk material that is acid, alkali, and water resistant, impregnated with a combination of a chlorinated (3 or (5 hydrocarbon, a chlorinated terphenyl or chlorinated paraffin (as a plasticizer), and a polyglycidyl ether polyhydric phenol such as bisphenol A or bisphenol F. This impregnating material is claimed to increase durability under pH and temperature extremes that normally cause rapid disintegration of conventional contact materials.

While all the foregoing impregnating methods offer certain advantages, they also have significant drawbacks. The polymers in the prior art are anionic, meaning that they attract positively charged particles or ions, which include the dissolved metals previously discussed. Thus, these polymers aggravate scale build-up which shortens the media's useful life span. In addition, most of these polymers have values of interfacial tension that are only a fraction of the value for water, resulting in a large interfacial tension between the surface of the polymer and the water. This means that the water will not be able to wet the polymer as well as will more compatible polymers, which in turn means these materials will evaporate water at a lower rate than untreated material, given the same operating conditions and media size.

International Patent Application W091 03778 (hereafter IPA '778), filed by Myers et al., and U.S. Pat. No. 5,260,117, issued to Meyers et al., teaches impregnating a honeycomb structure with various thermosetting polymers to improve the structure's mechanical properties. A critical feature of the teachings is that the polymer precursors are dissolved in a solvent that does not dissolve the resulting polymer. The honeycomb is dipped in the solution, then heated in an oven which evaporates the solvent and is claimed to cause the precursors to react and form the final thermosetting polymer by homolineation, a reaction that results in long unbranched polymer chains without crosslinking. (The IPA '778 mistakenly describes the polymers as thermoplastic in nature, and makes numerous other errors, ascribing several characteristics to the polymer that are present in thermoplastic polymers, but not in thermosetting polymers, such as absence of crosslinking. These mistakes are substantially but not completely corrected in U.S. Pat. No. 5,260,117 [e.g. continued requirement for the absence of crosslinking in thermosetting polymers; separately applied thermosetting polymer layers are said to "fuse" together when the layers actually adhere to each other].) The polymer homologs taught in the Meyers et al. references are selected on the basis of mechanical properties such as strength, impact resistance and surface finish and appearance; there is no discussion of chemical properties such as wettability, ionic behavior, and solubility in water. Both Meyers et al. references only discuss solubility with respect to the solvent, and only polar organic solvents are specifically listed. Analysis of Meyers reveals that many of the polymer homologs will exhibit the undesirable interfacial tension and anionic behavior of the previously discussed prior art polymers; some of the listed polymers will also have hydrolysis decomposition problems.

A desirable replaceable contact media will have relatively high water resistance (i.e., low solubility in water) and retain its strength when wet. The contact media should also resist scale build-up and have improved wetting properties relative to conventional polymers for greater evaporative rates. The contact media preferably will also resist growth of mold, algae, mildew and other microbes. The media should retain these properties and resist chemical breakdown in the presence of acidic or alkaline conditions. As always, a contact media that is less expensive to manufacture is also desired.

SUMMARY OF THE INVENTION

In general, a structure having the desired features and advantages is achieved by a fibrous material impregnated with a compound to extend the life span and enhance performance of the contact media. The fibrous material has an effective amount of void space between the fibers for more effective surface area and to promote water distribution throughout the media. The impregnating compound has a polymer based continuous phase designed to have solubility and surface properties within preselected limits. The polymer-based continuous phase can be made from a single type of polymer or a mixture of two or more polymers. The polymers selected for use in the compound are insoluble in water and exhibit greater stability under acidic and alkaline conditions than prior art polymers such as phenolics and phenolic aldehydes. In addition, the polymer-based continuous phase has surface tension and interfacial tension properties within preselected limits in order to ensure improved wetting by the recirculated water compared to conventional polymers. The impregnating compound is designed to be at least weakly cationic, and preferably strongly cationic in nature to enhance its resistance to scale build-up. Additives can optionally be applied to the continuous phase to resist growth of microbial species and for aesthetics such as color and fragrance. An optional discontinuous phase made up of fillers, pigments and extenders can be dispersed in the continuous phase.

The impregnating compound is present in the finished product in an amount ranging from about three to about sixty percent by weight on a dry basis, with the fibrous material making up the balance. Preferably, the impregnating compound is present in the finished product in an amount ranging from about five to about twenty five percent by weight on a dry basis. Even more preferably, the impregnating compound in present in the finished product in an amount ranging from about ten to about fifteen percent by weight on a dry basis.

The contact media can be made in any suitable shape. The preferred configuration is a series of corrugated sheets stacked together, with adjacent sheets being canted so that the corrugations form channels for water and air flow. In an especially preferred embodiment, the sheets are arranged so that the acute angle formed by the corrugations has a thirty degree span. The stacks of sheets are preferably cut into rectangles so that a line drawn parallel to a side of the rectangle will bisect one of the angles formed by the corrugations.

The contact media of the invention overcomes several drawbacks of the prior art. Recirculating water will wet the new contact media more effectively compared to media impregnated with conventional polymers, yet the contact media has slower scale build-up rates as a result of the impregnating compound's surface properties and overall cationic nature. The impregnating compound can also be designed to be substantially insoluble in water and to be stable in either acidic or alkaline conditions.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
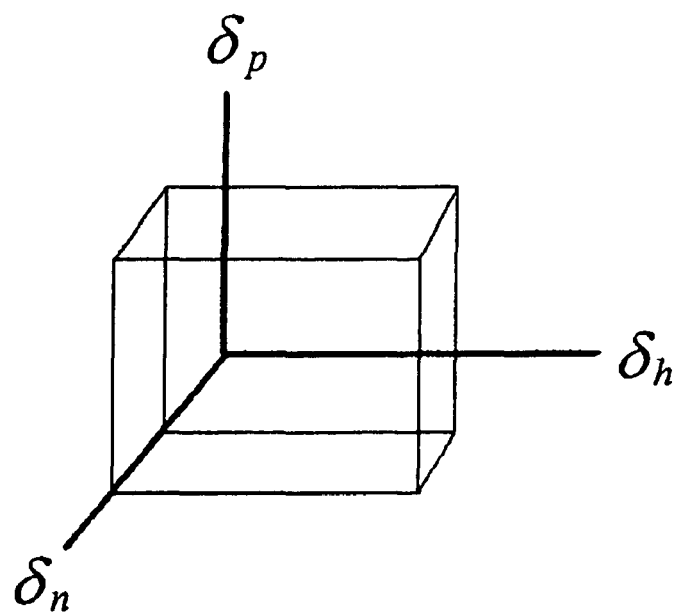
FIG. 1 is a three-dimensional representation of a solubility 'space', including a plot of the largest domain volume of allowed solubility parameter values.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

As used herein the abbreviation PVC is used to denote polyvinyl chloride.

As used herein the abbreviation PAN is used to denote polyacrylonitrile.

As used herein the abbreviation PMA is used to denote poly(methyl acrylate).

As used herein the abbreviation PAI is used to denote polyamide-imides.

As used herein the abbreviation PBA is used to denote poly(butyl acrylate).

As used herein the abbreviation PS is used to denote polystyrene.

As used herein the abbreviation PBD is used to denote polybutadiene.

As used herein the abbreviation CPMA-AN is used to denote a copolymer of methyl acrylate and acrylonitrile.

As used herein the abbreviation CPBA-AI is used to denote a copolymer of butyl acrylate and amide-imides.

As used herein the abbreviation CPS-BD is used to denote a copolymer of styrene and butadiene.

The contact media of the invention is made up of two major components, which will be labeled Component I and Component II for convenience. Component I is a fibrous material formed into a suitable shape. Component II is impregnated into and affixed to the fibrous material and has a continuous phase based on one or more polymers. Component II makes up from three to sixty percent by weight of the finished product on a dry basis. Preferably, Component II makes up from about five to about twenty-five percent by weight of the finished product, and more preferably makes up from about ten percent to about fifteen percent by weight. In each case, Component I makes up the balance of the total weight of the contact media.

Component I can be made from a number of standard fibrous materials known in the industry such as cellulose, fiberglass, and asbestos or combinations thereof. The fibrous material should have suitable rigidity, high surface area, light weight (i.e., low density), and relatively low cost, so that its regular replacement will be economically acceptable. The media can be configured in stacked arrays or formed into drip pads, sprayed pads, packed cells, rotating wheels, or other shapes.

A major portion of Component II is a continuous phase having one or more polymers, which can be either thermoplastic or thermosetting types of plastic, or a combination of both. The final weight average molecular weight of each polymer should be at least about 2500 g/mole. Suitable polymers include epoxies, polyacetals, polyacrylates, polyacrylics, polyacrylamides, polyalkylamides, polyamides, polyamideimides, polycarbonates, polycarboxylicdihydric esters, polyimides, polyesters, polycellulose acetate butyrates, polydiglycidyletheralkyl/aryldiols, polysilicones, polysiloxanes, polysiloxides, polystyrenes, polysucrose acetate butyrates, polysulfonamides, polysulfones, polyurethanes, polyvinylacetals, and polyvinylhalogens. The polymer can be one of the above enumerated types, or a combination of two or more types, as well as copolymers of the above in whole or, in part, and other polymers known in the art or that will become known in the art as substitutes. The polymers used should be stable in acidic and alkaline conditions normally encountered in recirculating water. Component A can optionally include transient and/or permanent plasticizers such as dialkyl/aryl phthalates, dialkyl/aryl adipates, dialkyl/aryl maleates, dialkyl/aryl succinates, dialkyl/aryl sebacates, polyalkyl/aryl phosphates, polyesters, and condensation polymers and resins known in the art as plasticizers and flexibilizers.

Throughout the following discussion, the law of mixtures is assumed to apply when calculating overall physical and chemical parameters. That is, the value of a particular parameter for a mixture having two or more components is equal to the sum of the products of each component's parameter value times that component's mole fraction. Expressed in mathematical terms:

$$V_{total} = \Sigma V_i x_i \text{ } (i=1 \text{ to } n; \text{ } \Sigma x_i = 1) \quad 1)$$

where V is the parameter value and Xi is the mole fraction of the ith component.

The solubility of a material, whether pure compound or a mixture (or an ingredient within a mixture), can be described by three solubility parameters, which will be represented for convenience by the symbols δn, δp, and δh. These parameters are measures of the solubility of the material with respect to the nonpolar, polar, and hydrogen-bonding aspects of the material, respectively, and are expressed in units of g-cal/mole. They can be determined experimentally, or calculated by a method to be discussed. The nonpolar parameter δn mainly describes the physical aspects of the material's solubility, while the polar and hydrogen-bonding parameters δp and δh primarily describe the chemical aspects of the solubility of the material. If these three parameters are viewed as the axes of a three-dimensional solubility 'space' describing all possible combination of values for the three parameters of the solubility space, then for any particular combination of δn, δp, and δh there is a total solubility parameter, represented by δt, equal to the geometric distance in the solubility space from the axis origin to the point in the solubility 'space' with the particular values for δn, δp, and δh. Using classic analytical geometry, the total solubility parameter δt is the positive root of the sum of the squares of the solubility parameters described in the following equation:

$$\delta_t \sqrt{\delta_h^2 + \delta_n^2 + \delta_p^2} \quad 2)$$

The total solubility parameter δt can also be derived using the Haggenmacher equation for vapor pressure, which can be expressed as:

$$\delta_t = \sqrt{\frac{RTd}{M} \sqrt{1 - \frac{PT_c^3}{P_c T^3} \left[ \frac{2.303BT}{(t+C)^2} - 1 \right]}} \quad 3)$$

where R=Gas constant=1.987 cal/mole/° K.; Tb=Boiling temperature, ° K.; Tc=Critical temperature, ° K.; M=Molecular weight, g/mole; P=Pressure, mm of Hg; T=Absolute Temperature, ° K.; t=Temperature, ° C.; d=Density, g/ml; Pc=Critical pressure, mm of Hg; and A, B, C=constants in Antoine's equation log P=−B/(t+C)+A. In most cases, the Antoine equation can be used to find the values for Tb at 760 mm of Hg and the vapor pressure Pat 25° C. The significance of the solubility parameters will become apparent in the following discussion.

We can define a dimensionless aggregation constant, represented by a, that describes the tendency of a chemical component to associate with itself, and that is determined by the relationship:

$$\log \alpha = 3.39068(T_b/T_c) - 0.15848 - \log(M/d) \quad 4)$$

the polar parameter δp and the hydrogen bonding parameter δh can then be expressed in terms of the aggregation constant α and the total solubility parameter δt by the following equations:

$$\delta_p = \delta_t \sqrt{\frac{\Sigma F_p}{\alpha \Sigma F_t}} \quad 5)$$

$$\delta_h = \delta_t \sqrt{\frac{\alpha - 1}{\alpha}} \quad 6)$$

where Fp and Ft are the molar cohesion constants for the individual compounds at constant pressure and constant temperature, respectively. These constants are based on the chemical structural identity of the polymers. Tables of these constants for various chemical functional groups, found by experiment, are available from sources such as the CRC Press, Inc., "Handbook of Chemistry and Physics," 63rd Edition, 1982-1983, pages C-732 to C-734. Values for some common functional groups are listed in Table 1. Having determined $\delta p$ and $\delta h$, the nonpolar parameter $\delta n$ can then be derived from Eq. (2):

$$\delta_n = \sqrt{\delta_t^2 - (\delta_p^2 + \delta_h^2)} \qquad 7)$$

TABLE 1

Molar Cohesion Constants And Lyderson Chemical Group Constants

| Chemical Group | Chemical Bond Type | Molar Cohesion $F_t$ | Molar Cohesion $F_p$ | Volume Constant $V_{Tg}$ | Aliphatic delta T | Cyclic delta T | Lyderson Chemical Group Constant | | |
|---|---|---|---|---|---|---|---|---|---|
| | | | | | | | delta $P_t$ | Aliphatic delta P | Cyclic delta P |
| —CH3 | alkyl | 148.30 | 0.00 | 21.548 | 0.020 | 0.000 | 0.0226 | 0.227 | 0.000 |
| —CH2— | alkyl | 131.50 | 0.00 | 15.553 | 0.020 | 0.013 | 0.0200 | 0.227 | 0.184 |
| >CH— | alkyl | 88.00 | 0.00 | 9.557 | 0.012 | 0.012 | 0.0131 | 0.210 | 0.192 |
| >C< | alkyl | 32.00 | 0.00 | 3.562 | 0.000 | −0.007 | 0.0040 | 0.210 | 0.154 |
| CH2= | olefinic | 126.50 | 32.70 | 19.173 | 0.018 | 0.000 | 0.0182 | 0.198 | 0.000 |
| —CH= | olefinic | 121.50 | 29.10 | 13.178 | 0.018 | 0.011 | 0.0184 | 0.198 | 0.154 |
| >C= | olefinic | 84.50 | 30.80 | 7.183 | 0.000 | 0.011 | 0.0129 | 0.198 | 0.154 |
| —CH= | aromatic | 117.30 | 30.40 | 13.417 | 0.000 | 0.011 | 0.0178 | 0.000 | 0.154 |
| >C= | aromatic | 98.10 | 31.70 | 7.422 | 0.000 | 0.011 | 0.0149 | 0.000 | 0.154 |
| -O- | ether | 115.00 | 105.60 | 6.462 | 0.021 | 0.014 | 0.0175 | 0.160 | 0.120 |
| -O- | acetal | 115.50 | 5.00 | 6.462 | 0.011 | 0.020 | 0.0225 | 0.090 | 0.120 |
| -O- | oxirone | 176.20 | 76.20 | 6.462 | 0.000 | 0.027 | 0.0287 | 0.000 | 0.120 |
| —COO— | ester | 326.60 | 256.20 | 23.728 | 0.047 | 0.000 | 0.0497 | 0.700 | 0.000 |
| >C=O | ketone | 263.00 | 257.00 | 17.265 | 0.040 | 0.033 | 0.0400 | 0.290 | 0.020 |
| —CHO | aldehyde | 292.84 | 259.90 | 23.251 | 0.048 | 0.000 | 0.0445 | 0.330 | 0.050 |
| >(CO)2O | anhydride | 567.30 | 567.00 | 40.993 | 0.088 | 0.000 | 0.0863 | 0.760 | 0.000 |
| —COOH | acid | 276.10 | 203.20 | 26.102 | 0.039 | 0.000 | 0.0390 | 0.700 | 0.000 |
| —OH—> | H-bond | 237.50 | 237.50 | 10.647 | 0.082 | 0.000 | 0.0343 | 0.060 | 0.000 |
| —OH | primary | 329.40 | 329.40 | 12.457 | 0.082 | 0.000 | 0.0493 | 0.060 | 0.000 |
| —OH | secondary | 289.20 | 289.20 | 12.457 | 0.082 | 0.000 | 0.0440 | 0.060 | 0.000 |
| —OH | tertiary | 390.40 | 380.40 | 12.457 | 0.082 | 0.000 | 0.0593 | 0.060 | 0.000 |
| —OH | phenolic | 171.00 | 171.00 | 12.457 | 0.035 | 0.000 | 0.0060 | −0.020 | 0.000 |
| —NH2 | amino 1 | 226.60 | 226.60 | 17.012 | 0.031 | 0.000 | 0.0345 | 0.095 | 0.000 |
| —NH— | amino 2 | 180.00 | 180.00 | 11.017 | 0.031 | 0.024 | 0.0274 | 0.135 | 0.090 |
| >N— | amino 3 | 61.10 | 61.10 | 12.569 | 0.014 | 0.007 | 0.0093 | 0.170 | 0.130 |
| —C=N | nitrite | 354.60 | 354.20 | 23.066 | 0.060 | 0.000 | 0.0539 | 0.360 | 0.000 |
| —NCO | isocyanate | 358.70 | 4.00 | 25.907 | 0.054 | 0.000 | 0.0539 | 0.460 | 0.000 |
| HCON< | formamide | 497.20 | 354.00 | 35.830 | 0.062 | 0.000 | 0.0546 | 0.500 | 0.000 |
| —CONH— | amide | 554.70 | 437.00 | 28.302 | 0.071 | 0.000 | 0.0843 | 0.425 | 0.000 |
| —CONH2 | amide | 589.90 | 483.60 | 34.297 | 0.071 | 0.000 | 0.0897 | 0.385 | 0.000 |
| OCONH | urethane | 616.90 | 436.20 | 34.784 | 0.078 | 0.000 | 0.0938 | 0.605 | 0.000 |
| —S— | thioether | 209.40 | 209.40 | 18.044 | 0.015 | 0.008 | 0.0318 | 0.270 | 0.240 |
| —SH | thiohydride | 215.60 | 211.30 | 24.039 | 0.015 | 0.000 | 0.0150 | 0.270 | 0.000 |
| Cl | primary | 205.10 | 150.00 | 19.504 | 0.017 | 0.000 | 0.0311 | 0.320 | 0.000 |
| Cl | secondary | 208.30 | 154.00 | 19.504 | 0.017 | 0.000 | 0.0317 | 0.320 | 0.000 |
| Cl | twinned | 342.70 | 275.00 | 39.008 | 0.034 | 0.000 | 0.0521 | 0.040 | 0.000 |
| Cl | aromatic | 161.00 | 39.80 | 19.504 | 0.017 | 0.000 | 0.0245 | 0.320 | 0.000 |
| Br | primary | 257.90 | 60.00 | 25.305 | 0.010 | 0.000 | 0.0392 | 0.500 | 0.000 |
| Br | aromatic | 205.60 | 49.00 | 25.305 | 0.010 | 0.000 | 0.0313 | 0.500 | 0.000 |
| F | primary | 41.30 | 35.80 | 11.200 | 0.018 | 0.000 | 0.0060 | 0.224 | 0.000 |
| Conjugation | | 23.26 | −9.70 | 0.000 | 0.000 | 0.000 | 0.0035 | 0.000 | 0.000 |
| cis | | −7.13 | −7.10 | 0.000 | 0.000 | 0.000 | −0.0010 | 0.000 | 0.000 |
| trans | | −13.50 | −13.50 | 0.000 | 0.000 | 0.000 | −0.0020 | 0.000 | 0.000 |
| 4 member | ring | 77.76 | 98.00 | 0.000 | 0.000 | 0.000 | 0.0118 | 0.000 | 0.000 |
| 5 member | rino | 20.99 | 41.50 | 0.000 | 0.000 | 0.000 | 0.0030 | 0.000 | 0.000 |
| 6 member | ring | −23.44 | 29.80 | 0.000 | 0.000 | 0.000 | −0.0035 | 0.000 | 0.000 |
| 7 member | ring | 45.10 | 0.00 | 0.000 | 0.000 | 0.000 | 0.0069 | 0.000 | 0.000 |
| bicycloheptane | ring | 22.56 | 0.00 | 0.000 | 0.000 | 0.000 | 0.0034 | 0.000 | 0.000 |
| tricyclodecane | ring | 62.47 | 0.00 | 0.000 | 0.000 | 0.000 | 0.0095 | 0.000 | 0.000 |
| base value | | 135.10 | 0.00 | 0.000 | 0.000 | 0.000 | 0.0000 | 0.000 | 0.000 |
| ortho substitution | | 9.70 | −6.50 | 0.000 | 0.000 | 0.000 | 0.0015 | 0.000 | 0.000 |
| meta substitution | | 6.60 | −11.90 | 0.000 | 0.000 | 0.000 | 0.0010 | 0.000 | 0.000 |
| para substitution | | 40.30 | −16.50 | 0.000 | 0.000 | 0.000 | 0.0060 | 0.000 | 0.000 |

The preceding equations for finding $\delta n$, $\delta p$, and $\delta h$ are based on data for molecular weights less than about 1000. As the molecular weight of a polymer increases, values for $\delta n$, $\delta p$, and $\delta h$ shift slightly from the values for the lower molecular weight analogs. Calculating this shift and effect, the number of monomer units n can be determined by the following equation:

$$n = 1/(2\Sigma \Delta P_t) \qquad 8)$$

where $\Sigma \Delta P_t$ is the sum of the aggregation constants for the repeating unit of the segment in the polymer chain. The total solubility parameter for the polymer can then be expressed as:

$$\delta_t = (n\Sigma F_t + 135)/(n\Sigma V_{Tg}) \qquad 9)$$

where $\Sigma V_{Tg}$ is the sum of the group molar volume constants for the repeating unit at the glass transition temperature. We can define a chain aggregation number, symbolized by $\alpha^*$, that represents the aggregation constant for a polymer chain having a weight average molecular weight greater than about 1000. The chain aggregation number is applied in the same manner as the lower molecular value α1 and can be calculated from the following equation:

$$\alpha^* = (777.4 \Sigma P_T)/\Sigma V_m \qquad (10)$$

where $\Sigma V_m$ is the sum of the molar volumes of the repeating units. The high molecular weight polymer solubility parameters δn, δp, and δh can then be calculated by using α* in place of α in equations 5, 6, and 7.

To ensure that the impregnating compound is insoluble in water, the three solubility parameters for the polymer mixture are limited to specific ranges. Table 2 lists the range limits as minimum and maximum values for three embodiments, listed from left to right in increasing amount of preference. To aid in visualizing the range of possible values for the solubility parameters, FIG. 1 shows the volume domain defined in the solubility 'space' by the ranges of the solubility parameters for the embodiment having the largest range of values. The volume domain is a rectangular solid offset from the origin along the nonpolar parameter δn axis by 6.5 g-cal/mole, the minimum value for δn the three embodiments of Table 2 would be represented by three nested rectangular solids, like boxes in boxes.

TABLE 2

Solubility Parameter Limits

| Solubility Parameter | Preferred | | More Preferred | | Most Preferred | |
|---|---|---|---|---|---|---|
| | Min. | Max. | Min. | Max. | Min. | Max. |
| $\delta_p$ | 0.0 | 8.5 | 2.5 | 7.5 | 3.0 | 5.5 |
| $\delta_h$ | 0.0 | 7.0 | 0.7 | 5.0 | 1.0 | 4.0 |
| $\delta_n$ | 6.5 | 8.5 | 6.5 | 8.5 | 6.5 | 8.5 |

Table 3 lists five examples of polymer mixtures that can be used to make an impregnating compound continuous phase having solubility parameters falling within the specified ranges in Table 2. The resulting solubility parameters for each example are listed in Table 4 in g-cal/mole. In both tables, values listed for individual components in each example are expressed as weight percent.

TABLE 3

| Component Name | $\delta_n$ | $\delta_p$ | $\delta_h$ | Ex. 1 | Ex. 2 | Ex. 3 | Ex. 4 | Ex. 5 |
|---|---|---|---|---|---|---|---|---|
| Polyvinyl chloride | 7.55 | 5.50 | 3.37 | — | — | 40 | — | — |
| Polyacrylo-nitrile | 6.75 | 7.94 | 6.62 | — | — | — | — | 20 |
| Polymeth-acrylate | 7.42 | 5.01 | 2.94 | — | — | 60 | — | — |
| Polyamide-imide | 7.84 | 7.11 | 6.43 | 100 | — | — | 70 | — |
| Polybutyl-acrylate | 7.90 | 4.28 | 3.54 | — | 100 | — | — | — |
| Polystyrene | 8.17 | 4.03 | 2.38 | — | — | — | 30 | 40 |
| Polybutadiene | 6.36 | 2.93 | 3.32 | — | — | — | — | 40 |
| | | | Total | 100 | 100 | 100 | 100 | 100 |

TABLE 4

| Solubility Parameters of Component A: | Ex. 1 | Ex. 2 | Ex. 3 | Ex. 4 | Ex. 5 |
|---|---|---|---|---|---|
| $\delta_n$ | 7.84 | 7.90 | 7.47 | 7.94 | 7.16 |
| $\delta_p$ | 7.11 | 4.28 | 5.21 | 6.19 | 4.37 |
| $\delta_h$ | 6.43 | 3.54 | 3.11 | 5.22 | 3.60 |

When two or more polymers are mixed to create the impregnating compound, the compatibility of the polymer components should be considered. The degree of compatibility between any two components is proportional to the distance between the points that represent the two polymers in the solubility 'space'. A shorter distance between the points represents greater compatibility between the polymers. Where more than two polymers are in the mixture, it is necessary to determine each polymer's molar fraction in the mixture where all the molar fractions add up to 1. Then, applying the law of mixtures and averaging, each polymer's solubility parameters are multiplied by its molar fraction, and the products are averaged together to find the geometric mean location of the polymer mixture. Calculating the distance between an individual polymer's location in solubility 'space' and the geometric mean location of the polymer mixture in solubility 'space' will identify the compatibility of an individual polymer with the mixture.

The polymer mixture is designed to be insoluble with both water and the scale-depositing species in the water. The scale depositing species dissolve relatively well in water because of their high solubility (i.e. proximity in the solubility 'space') with water. For both the water and the scale depositing species the value for δh, (the hydrogen-bonding parameter) is much greater than the values for the polar and nonpolar parameters. In contrast, the polymer mixture is designed to have a value for the hydrogen-bonding parameter that is much smaller than the value for either the water or the scale-depositing species. The difference in relative sizes of the hydrogen bonding parameters is the main reason why the polymer is insoluble with both the water and the scale-depositing species. The insolubility of the polymer with the scale depositing species helps to prevent any initial deposition of scale on the polymer surface. This is very important, because once a monoatomic scale layer is deposited on the polymer surface, the polymer effectively has little or no influence on the scale buildup rate. The scale build-up rate is then governed by the affinity of scale-depositing species to bond to the existing scale layer. This affinity results in a scale build-up rate that is exponentially greater than the rate at which the scale will deposit on the polymer.

The previous discussion has described the means for selecting polymers to achieve the required solubility characteristics. Means for achieving the necessary surface tension and interfacial tension properties of the impregnating compound's continuous phase will now be discussed.

Surface tension is the attractive force exerted by the molecules below a material's surface upon the molecules at a solid/gas or liquid/gas interface. This force results from the high molecular concentration of a liquid or solid compared to the low molecular concentration of a gas, as well as upon other factors to be discussed below. The result of this force, put simply, is that an inward pull, or internal pressure, is created that tends to restrain the liquid or solid from flowing. Its strength varies with the chemical nature of the liquid or solid. The higher the surface tension, the greater the resistance to flow of the liquid or solid into the gas.

Interfacial tension describes behavior at solid/solid, liquid/liquid, and solid/liquid interfaces. Higher interfacial tensions yield less intimate contact of the components on each side of the interface. For solid/liquid interfaces, this means there will be less wetting of the interfacial surface by the liquid. As in the case of solubility, the impregnating compound needs to be designed with surface tensions and interfacial tensions within acceptable limits so that water will intimately contact the impregnated media to achieve optimal evaporation rates. Distinction will be made between pure water and typical in-service water, when the distinction is relevant.

Surface tension, represented by Y, is the reversible work required to create a unit surface area of (solids and liquids)/gas interface at constant temperature, pressure, and chemical composition, expressed mathematically as:

$$\gamma = (\partial G/\partial A)_{T,P,n} \quad (11)$$

where $\gamma$ is the surface tension, G the Gibbs free energy of the system, and A the surface area of the interface. The specific surface free energy fh is the free energy per unit surface area, which can be expressed for a system having n components as a function of the surface tension and the component concentrations as follows:

$$f_h = \gamma + \Sigma C_i \mu_i \text{ (for } i=1 \text{ to } n) \quad (12)$$

where C is the surface concentration (number of moles per unit area) of component i, and $\mu_i$ is the chemical potential of component i. Rearranging Eq. 12 gives:

$$\gamma = f_h - \Sigma C_i \mu_i \quad (13)$$

which means the surface tension is equal to the specific surface free energy in excess of the bulk phase. Surface and interfacial tensions are influenced most greatly by the chemical composition of the components which defines the predominance of the surface free energy, surface concentration, and the chemical potential of the components in accordance with equation 13.

In the same manner as with solubility, surface tension can be separated into nonpolar (dispersion), polar, and hydrogen bonding components:

$$\gamma = \gamma_d + \gamma_p + \gamma_h \quad (14)$$

where $\gamma d$ is the dispersion component arising from dispersion force interaction, $\gamma p$ the polar component arising from various dipolar and polar interactions, and $\gamma h$ the hydrogen bonding component arising from the hydrogen bonding character and tendency. The dispersion component $\gamma d$, the polar component $\gamma p$, and the hydrogen bonding component $\gamma h$ are calculated from the previously discussed solubility parameters:

$$\gamma_d = \gamma(\delta_n/(\delta_n + \delta_p + \delta_h)) \quad (15)$$

$$\gamma_p = \gamma(\delta_p/(\delta_n + \delta_p + \delta_h)) \quad (16)$$

$$\gamma_h = \gamma(\delta_h/(\delta_n + \delta_p + \gamma_h)) \quad (17)$$

The interfacial tension can be calculated from the surface tension and the dispersion, polarity, and hydrogen bonding components of the two contiguous phases using the harmonic mean equation, shown in C. M. Hansen, "The Three Dimensional Solubility Parameter and Solvent Diffusion Coefficient", Danish Technical Press, Copenhagen, 1967 and in S. Wu, "Polymer Interface and Adhesion", Marcel Dekker, New York, 1982:

$$\gamma_{12} = \gamma_1 + \gamma_2 - 4\gamma_{1d}\gamma_{2d}/(\gamma_{1d}+\gamma_{2d}) - 4\gamma_{1h}\gamma_{1h}/(\gamma_{1h}+\gamma_{2h}) \quad (18)$$

or by using the Berthelot's geometric equation found in D. H. Kaelble, "Physical Chemistry of Adhesion," Wiley, New York, 1971; F. M. Fowkes, "Chemistry and Physics of Interfaces," American Chemical Society, Washington, D.C., 1965; and in D. K. Owens and R. C. Wendt, J. Applied Polymer Science, 13, 1741, 1969:

$$\gamma_{12} = \gamma_1 + \gamma_2 - 2(\gamma_{1d}\gamma_{2d})^{0.5} - 2(\gamma_{1p}\gamma_{2p})^{0.5} - 2(\gamma_{1h}\gamma_{2h})^{0.5} \quad (19)$$

where the subscripts 1 and 2 refer to the two individual phases. The harmonic-mean equation (equation 18) has been shown to predict the interfacial tensions between polymers more accurately than the geometric-mean equation (equation 19).

Careful consideration should be given during design of the impregnating compound to the surface chemical constitution and the surface tensions of chemical groups at the interfacial surface, as these factors will influence the magnitude of the total interfacial tension when the in-service water contacts the impregnating compound. Table 5 lists the surface tension of various surface chemical groups. The hydrocarbon groups present at the interfacial surface contribute relatively medium surface tensions, while fluorocarbon groups contribute low to medium surface tensions, chlorohydrocarbon groups contribute high surface tensions, and silicone groups contribute low surface tensions. Water has a relatively large value for surface tension, about 73 dyne/cm at 20° C., so designing the impregnating compound to have a similarly large value of surface tension will aid wetting of the surface by the water. Some low surface tension polymers and/or surface chemical groups can be combined with high surface tension polymers to yield mixtures having intermediate surface tension values while remaining within the surface tension design ranges identified below.

TABLE 5

Surface Chemical Constitution and Surface Tension

| Surface Chemical Groups | Surface Tension at 20° C. (dyne/cm = mN/m) |
|---|---|
| Hydrocarbon Surfaces | |
| —CH3 | 30 |
| —CH2— | 36 |
| —CH2— & ::CH:: | 43 |
| ::CH:: phenyl ring edge | 45 |
| Fluorocarbon Surfaces | |
| —CF3 | 15 |
| —CF2H | 26 |
| —CF3 & —CF2— | 17 |
| —CF2— | 23 |
| —CH2CF3 | 23 |
| —CF2—CFH— | 30 |
| —CF2—CH2— | 33 |
| —CFH—CH2— | 37 |
| Chlorohydrocarbon Surfaces | |
| —CHCl—CH2— | 42 |
| —CCl2—CH2— | 45 |
| =CCl2 | 50 |
| Silicone Surfaces | |
| —O—Si(CH3)2—O— | 20 |
| —O—Si(CH3)(C6H5)—O— | 26 |

Values for surface and interfacial tensions are tabulated on pages VI-414 to VI-432 in J. Brandrup and E. H. Immergut, "Polymer Handbook", 3rd Edition, John Wiley & Sons, 1989. This reference also lists surface tension and interfacial tension values for polymers and polymer/polymer systems, as well as other coefficients and data.

Values for surface tension and interfacial tension can be determined by experiment. One well known method makes use of a plot sometimes referred to as a Zisman Plot, that is more fully described in W. A. Zisman, "Relation of the Equilibrium Contact Angle to Liquid and Solid Constitution," Advances in Chemistry Series, No. 43, 1964. To create the Zisman plot, a drop of liquid is placed on the surface of a polymer. The contact angle formed by the drop of liquid is measured, and the cosine of this angle is plotted on a vertical axis against the measured or known surface tension of the liquid on a horizontal axis. This process is repeated for a number of different liquids with the same polymer in order to create the Zisman plot. A curve drawn through the data points is substantially linear, and can be extrapolated out to an intersection with a horizontal line drawn at cosine=1 (i.e. where the contact angle equals zero). The interfacial tension value at this intersection is called the critical surface tension γc Liquids at the critical surface tension γc would completely wet the polymer surface with a contact angle of zero degrees. The following equations identify the relationship of surface tension and contact angle: where γs is the surface tension of the solid phase; γ. is the surface tension of the liquid phase; Πe is the equilibrium spreading pressure; and θ is the contact angle. Equations 20 and 21 and the critical surface tension can then be used to find surface tensions and interfacial tension for a particular system.

Experimentation has shown that, for the desired wetting properties, the interfacial tension of the impregnating compound/in-service water interface needs to fall within specific limits. Table 6 lists the minimum and maximum values for three preferred ranges, listed from left to right in increasing amount of preference as in Table 2.

TABLE 6

| Surface/Interfacial Tension | Preferred | | More Preferred | | Most Preferred | |
| --- | --- | --- | --- | --- | --- | --- |
| | Min. | Max. | Min. | Max. | Min. | Max. |
| $\gamma_{st}$ | 20 | 70 | 30 | 68 | 40 | 68 |
| $\gamma_{it}$ | 0 | 30 | 0 | 23 | 0 | 15 |

Tables 7 and 8 list the surface tension and interfacial tension values of the example polymer components for the five example polymer mixtures listed in Table 3. Table 7 lists values with pure water as the liquid, while Table 8 is for typical in-service water. As in Table 3, the values listed for individual components in each example are expressed as weight percent. Table 9 lists the surface and interfacial tensions for the resulting impregnating compound continuous phases for both Tables 7 and 8.

TABLE 7

Surface Tension and Interfacial Tension of Various Components with Pure Water

| Component Name | γst | γit, H2O | Ex. 1 | Ex. 2 | Ex. 3 | Ex. 4 | Ex. 5 |
| --- | --- | --- | --- | --- | --- | --- | --- |
| Polyvinyl chloride | 40 | 23.7 | — | — | 40 | — | — |
| Polyacrylonitrile | 43 | 13.7 | — | — | — | — | 20 |
| Polymethacrylate | 36 | 26.7 | — | — | 60 | — | — |
| Polyamideimide | 42 | 15.8 | 100 | — | — | 70 | — |
| Polybutylacrylate | 32 | 28.3 | — | 100 | — | — | — |
| Polystyrene | 41 | 29.9 | — | — | — | 30 | 40 |
| Polybutadiene | 33 | 27.0 | — | — | — | — | 40 |
| Total | | | 100 | 100 | 100 | 100 | 100 |

TABLE 8

Surface Tension and Interfacial Tension of Various Components with In-Service Water

| Component Name | γst | γit, H2O+ | Ex. 1 | Ex. 2 | Ex. 3 | Ex. 4 | Ex. 5 |
| --- | --- | --- | --- | --- | --- | --- | --- |
| Polyvinyl chloride | 40 | 18.5 | — | — | 40 | — | — |
| Polyacrylonitrile | 43 | 9.3 | — | — | — | — | 20 |
| Polymethacrylate | 36 | 20.9 | — | — | 60 | — | — |
| Polyamideimide | 42 | 11.1 | 100 | — | — | 70 | — |
| Polybutylacrylate | 32 | 21.8 | — | 100 | — | — | — |
| Polystyrene | 41 | 24.6 | — | — | — | 30 | 40 |
| Polybutadiene | 33 | 20.7 | — | — | — | — | 40 |
| Total | | | 100 | 100 | 100 | 100 | 100 |

TABLE 9

Surface and Interfacial Tensions of Continuous Phase

| Property | Example 1 | Example 2 | Example 3 | Example 4 | Example 5 |
| --- | --- | --- | --- | --- | --- |
| Surface Tension (dyne/cm) | 42.0 | 32.0 | 37.6 | 41.7 | 38.2 |
| Interfacial Tension with pure water(dyne/cm) | 15.8 | 28.3 | 25.5 | 20.0 | 25.5 |
| Interfacial Tension with in-service water(dyne/cm) | 11.1 | 21.8 | 21.5 | 15.2 | 20.0 |

The polymer mixture is designed to have higher surface tensions (and therefore lower interfacial tensions with water) than polymers used in the prior art contact media. As a result, in-service water will have more intimate contact with the polymer mixture than it will with prior art polymers. Thus, it seems that more scale depositing will occur with the polymer mixture than with the prior art contact media, which would be undesirable. Fortunately, the tendency for scale build-up is not as great as it seems, due to other factors designed into the polymer mixture that opposes scale deposition. One of these is the high degree of difference of the solubility parameters of the polymer mixture and the scale-depositing species, as was previously discussed. A second factor is the choice of polymers that are generally cationic in nature, so that the polymer will repel positively charged ions and particles in the water.

Polymers are composed of cationic and anionic groups, present as part of the polymer backbone and as pendant structures attached to the backbone. Pendant ionic groups have much more ionic character and influence than do those in the backbone. Therefore, polymers having a high density of pendant cationic groups are preferred. Table 10 schematically depicts nine examples of pendant groups, showing how they bond to the polymer backbone. Rp represents a cationic group and Rn represents an anionic group. The formula groups are illustrated in decreasing order of cationic character from top left to bottom right:

TABLE 10

| Rp<br>\|<br>----Rp---- | ----Rp---- | Rn<br>\|<br>----Rp---- |
|---|---|---|
| Rp<br>\|<br>----Rn---- | Rp<br>\|\|<br>----Rn---- | Rn<br>\|<br>----Rn---- |
| Rp<br>\|\|<br>----Rp---- | ----Rn---- | Rn<br>\|\|<br>----Rn---- |

Table 11 lists a number of organic cationic groups that can be substituted for Rp in Table 10. Like Table 10, the groups are shown in decreasing order of cationic strength from top left to bottom right. Likewise, Table 12 lists a number of organic anionic groups that can be substituted for Rn in Table 10, in decreasing order of cationic strength (i.e. increasing order of anionic strength) from top left to bottom right.

TABLE 11

Cationic Chemical Groups

| Chemical Group | Chemical Bond | Chemical Group | Chemical Bond |
|---|---|---|---|
| —NH2 | amino 1 | bicycloheptane | ring |
| —CH3 base value | alkyl | 6 member >C< | ring alkyl |
| —CH2— | alkyl | 7 member | ring |
| CH2= | olefinic | 4 member | ring |
| —CH= | olefinic | conjugation cis | |
| >CH— | alkyl | | |
| >C= trans | olefinic | 5 member tricyclodecane | nag ring |

TABLE 12

Anionic Chemical Groups

| Chemical Group | Chemical Bond | Chemical Group | Chemical Bond |
|---|---|---|---|
| meta substituent | | —OH--> | H-bond |
| ortho substituent | | Cl | aromatic |
| F | primary | >C=O | ketone |
| para substituent | | —COOH | acid |
| Br | aromatic | —OH | secondary |
| >N— | amino 3 | —CHO | aldehyde |
| >C= | aromatic | —COO— | ester |
| -O- | ether | —OH | primary |
| -O- | acetal | Cl | tertiary |
| —CH= | aromatic | —C=N | nitrile |
| Cl2 | twinned | —NCO | isocyanate |
| —OH | phenolic | —OH | tertiary |
| —O— | oxirane | HCON< | formamide |
| —NH— | amino 2 | —CONH— | amide |
| Cl | primary | >(CO)2O | anhyride |
| Br | primary | —CONH2 | amide |
| Cl | secondary | OCONH | urethane |
| —S— | thioether | | |

Metallic ions can also be used as pendant groups to give the polymer cationic behavior. Using Tables 11 and 12, polymers can be selected having overall cationic behavior. In addition to the polymer mixture already described, the impregnating compound can optionally include one or more of the following materials: (1) fillers and/or extenders in particulate or fibrous form, (2) glass particulates and fibers, and (3) pigments. These materials are present as a discontinuous phase that is evenly dispersed in the continuous phase of the polymer mixture. The discontinuous phase can include materials such as carbon blacks, calcium silicates, calcium carbonates, aluminum silicates, calcium sulfates, barium sulfates, silicon dioxides, aluminum/silicon oxides, magnesium silicates, potassium/aluminum silicates, calcium silicates, cellulosic particulates and fibers, and glass particulates and fibers. The discontinuous phase can make up as much as about forty percent of the total weight of the impregnating compound. The pigments, fillers and extenders can be materials having high thermal conductivity such as particulate aluminum, graphite, and carbon black to increase the thermal transfer between the contact media and the surrounding environment.

Figure 2:
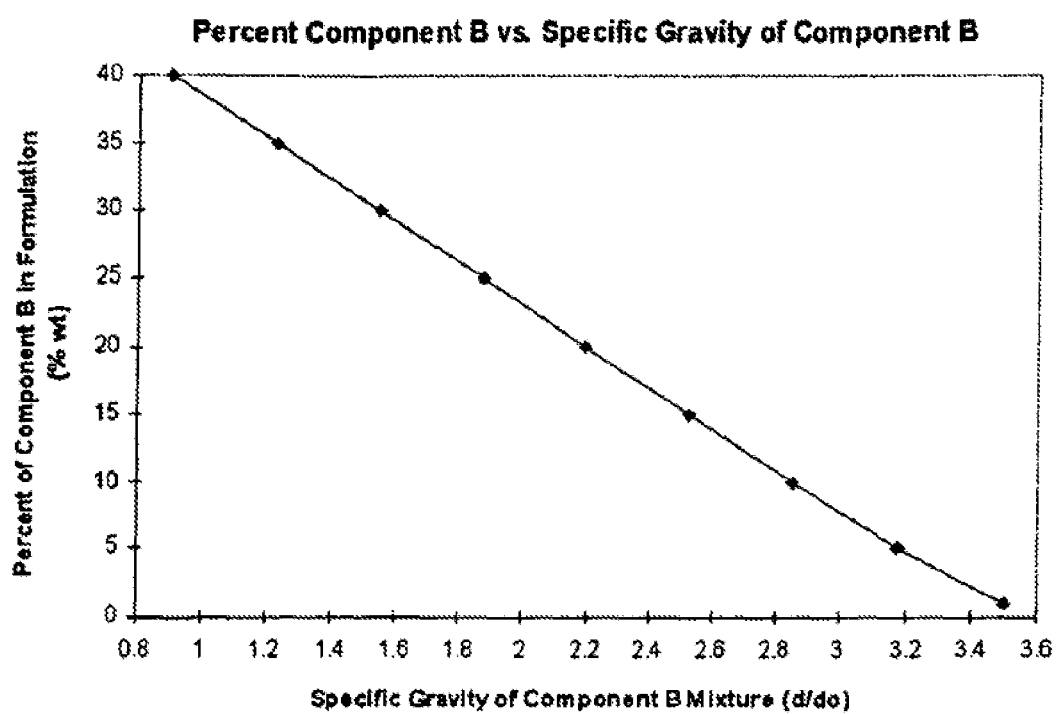
FIG. 2 is a plot of a domain range of permissible combinations of filler specific gravity and filler weight percent in the impregnating compound.

The ingredients of the discontinuous phase need to remain evenly dispersed in the polymer mixture until the impregnating compound becomes viscous enough to ensure uniformity of the chemical and physical properties throughout the contact media. Also, the sum of discontinuous phase density and weight percentage should be low enough to prevent the contact media from collapsing under its own weight in use. FIG. 2 depicts a graph of the weight percentage of the impregnating compound due to the discontinuous phase along the vertical axis versus the specific gravity of the discontinuous phase along the horizontal axis. The curve plotted on the graph is the upper constraint on permissible combinations of weight percentage of filler content and specific gravity, with the area below the curve being the permissible range. As can be appreciated from FIG. 2, as the percentage of Component B in the impregnating compound is increased, the maximum allowable specific gravity of the discontinuous phase decreases, and visa versa. The curve of FIG. 2 can be expressed as fourth power polynomial equations, where x represents the specific gravity of the Component B mixture and y represents the percent of the impregnating compound made up by the discontinuous phase:

$$x = 5E-0.07y^4 - 5E-0.05y^3 + 0.0016y^2 - 0.0852y + 3.5789 \quad 22)$$

$$y = 0.3656x^4 - 2.8743x^3 + 8.0047x^2 - 24.667x + 57.599 \quad 23)$$

In addition to the polymer mixture and the optional discontinuous phase, the impregnating compound can optionally include compounds to prohibit the growth of molds, fungi, mildew, algae, bacteria, and other microorganisms. These additives can make up as much as thirty percent by weight of the impregnating compound. Some suggested compounds include metallic oxides (such as titanium oxide, antimony oxide, zinc oxide, and cuprous oxide), cationic metaborates, boric acid, cationic carbonates, alkyl/aryl chlorides, aryl-metalosalicilates, arylmetalooleates, quinolinates, and alkylarylchlorophenols. Since some of these materials can become part of the continuous phase, care should be taken when choosing these components to maintain the solubility, surface tension, and interfacial tension properties of the continuous phase within the ranges previously described, as well as to maintain overall cationic character of the impregnating compound.

Pigment and fragrances can optionally be added as well for aesthetic appeal, and can to make up as much as four percent by weight of the impregnating compound. Care should also be taken when choosing these additives to maintain the solubility, surface tension, and interfacial tension properties within the ranges previously described, as well as to maintain overall cationic character of the impregnating compound.

Figure 3:
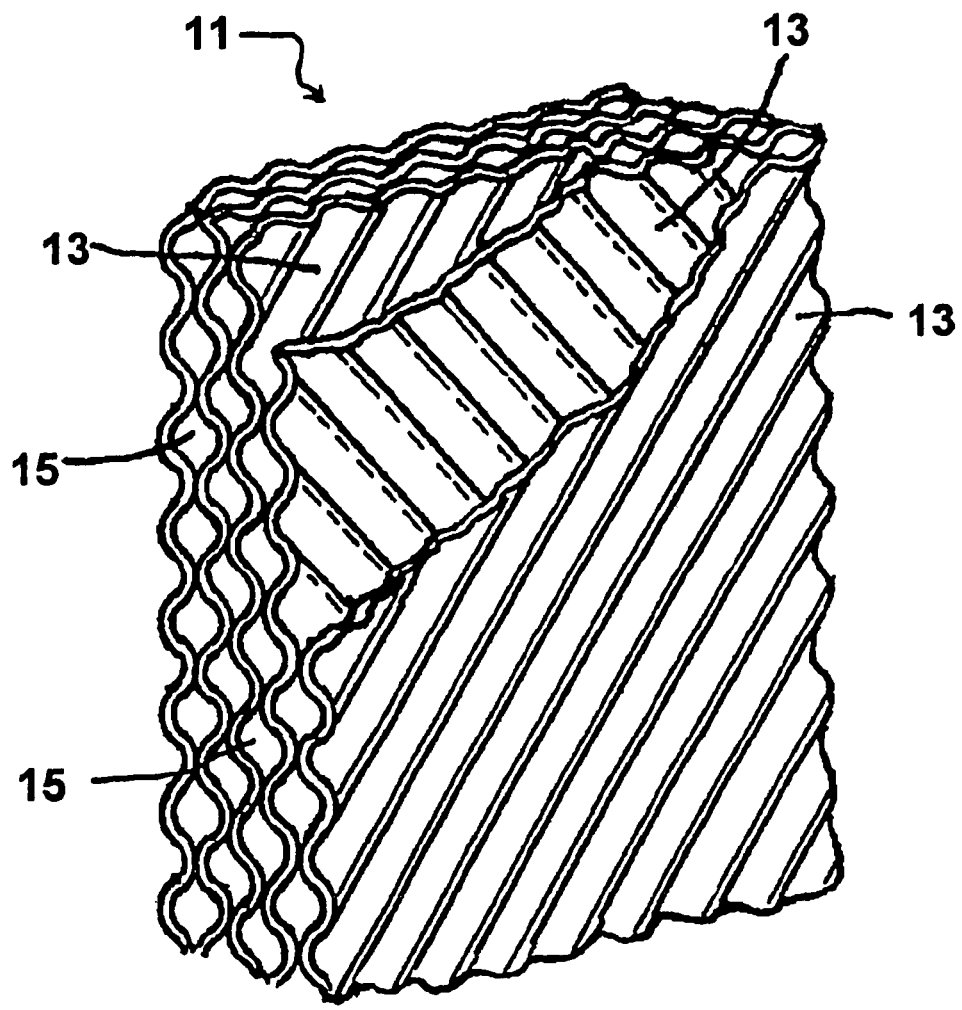
FIG. 3 is a perspective view of a preferred configuration for the structure of the contact media.

FIG. 3 shows the preferred structural configuration of the contact media 11 of the invention. The media is made up of several individual sheets 13 of impregnated fibrous material, shaped into corrugated sheets and stacked together with the corrugations in adjacent sheets at different angles to form channels 15 for water and air flow. In an especially preferred embodiment, the sheets are arranged so that each of the acute angles formed by the corrugations has a thirty degrees span. The stacks of sheets are preferably cut into rectangles with the acute angles oriented symmetrically about one of the rectangle's centerlines.

The impregnating compound can be applied to the fibrous material in a single layer, or applied in a series of layers that will adhere together. The impregnating compound can be applied so that the Component 1 fibrous material's surface area is either partially or completely covered. If the surface area is completely covered so thickly that the microscopic interstices between fibers are filled, the effective surface area will actually decrease and reduce evaporation rates. If the underlying structure is completely covered with the impregnating compound, another embodiment of the invention is possible as a variation on the preferred production method. An unsuitable material can be applied to the fibrous material first as an intermediate layer, then completely covered by the impregnating compound, where the term 'unsuitable material' is defined as any material used in the art for coating or impregnating contact media that does not have solubility parameters within the ranges disclosed for the impregnating compound, including without limitation the materials disclosed in the Background of the Invention. The final, multi-layer product would exhibit the same performance and advantages as a structure not having the intermediate layer.

Specific examples of the compositions of the instant invention are listed in the table below:

| Example | | PVC | PAN | PMA | PAI | PBA | PS | PBD | COPOLYMERS CPMA-AN, 1:1 | CPBA-AI, 4:1 | CPS-BD, 1:1 | Polymer Comp. Total (%) |
|---|---|---|---|---|---|---|---|---|---|---|---|---|
| | δnp | 7.55 | 6.75 | 7.42 | 7.84 | 7.90 | 8.17 | 6.36 | 6.88 | 7.50 | 7.87 | |
| | δp | 5.50 | 7.94 | 5.01 | 7.11 | 4.28 | 4.03 | 2.93 | 6.48 | 5.43 | 5.70 | |
| | δhb | 3.37 | 6.62 | 2.94 | 6.43 | 3.54 | 2.38 | 3.32 | 4.78 | 3.64 | 4.99 | |
| 1 | | | | | 100 | | | | | | | 100 |
| 2 | | | | | 90 | | 10 | | | | | 100 |
| 3 | | | | | 80 | | 20 | | | | | 100 |
| 4 | | | | | 85 | | | 15 | | | | 100 |
| 5 | | | | | 70 | | 30 | | | | | 100 |
| 6 | | | | | 75 | | | 25 | | | | 100 |
| 7 | | | | | 70 | | | 30 | | | | 100 |
| 8 | | 2 | 18 | 45 | 15 | 20 | | | | | | 100 |
| 9 | | | | | 65 | | | 35 | | | | 100 |
| 10 | | 25 | 14 | 36 | 10 | 15 | | | | | | 100 |
| 11 | | 32 | 13 | 33 | 7 | 15 | | | | | | 100 |
| 12 | | | | | | | | | 2 | 81 | 17 | 100 |
| 13 | | | | | | | | | | 80 | 20 | 100 |
| 14 | | | | | 50 | | 25 | 25 | | | | 100 |
| 15 | | 34 | 2 | 60 | 2 | 2 | | | | | | 100 |
| 16 | | | | 45 | | 15 | | | 10 | 10 | 20 | 100 |
| 17 | | 40 | | 60 | | | | | | | | 100 |
| 18 | | | | 100 | | | | | | | | 100 |
| 19 | | | | 50 | | 30 | | | 5 | 5 | 10 | 100 |
| 20 | | 20 | | 60 | | | 20 | | | | | 100 |
| 21 | | | | 55 | | 35 | | | 10 | | | 100 |
| 22 | | | | | 40 | | 20 | 40 | | | | 100 |
| 23 | | | | 55 | | 35 | | | | 10 | | 100 |
| 24 | | | | 50 | | 41 | | | 2 | 2 | 5 | 100 |
| 25 | | | | 20 | | 20 | | 20 | 10 | 10 | 20 | 100 |
| 26 | | 40 | | | | 60 | | | | | | 100 |
| 27 | | | | 60 | | 38 | | | 2 | | | 100 |
| 28 | | | | 60 | | 38 | | | | 2 | | 100 |
| 29 | | 10 | 7 | 11 | 13 | 9 | 24 | 26 | | | | 100 |
| 30 | | | | 40 | | 40 | | 10 | 10 | | | 100 |
| 31 | | 40 | | | | | 60 | | | | | 100 |
| 32 | | 5 | 8 | 5 | 15 | 5 | 30 | 32 | | | | 100 |
| 33 | | | | 40 | | 46 | | 9 | 5 | | | 100 |
| 34 | | | | 40 | | 40 | | 10 | | 10 | | 100 |
| 35 | | | | 40 | | 46 | | 9 | | 5 | | 100 |
| 36 | | | 7 | 13 | 8 | 18 | 32 | 22 | | | | 100 |
| 37 | | 10 | 5 | 10 | 10 | 10 | 25 | 30 | | | | 100 |
| 38 | | 30 | | | | | 70 | | | | | 100 |
| 39 | | | | 28 | | 28 | | 24 | 5 | 5 | 10 | 100 |
| 40 | | | 25 | | | | 25 | 50 | | | | 100 |
| 41 | | 15 | 2 | 15 | 6 | 14 | 22 | 26 | | | | 100 |
| 42 | | | 20 | | | | 40 | 40 | | | | 100 |
| 43 | | 15 | 2 | 15 | 5 | 15 | 20 | 28 | | | | 100 |
| 44 | | | | | 30 | | 15 | 55 | | | | 100 |
| 45 | | | | | 20 | 35 | 10 | 35 | | | | 100 |
| 46 | | 8 | 2 | 15 | 8 | 15 | 22 | 30 | | | | 100 |
| 47 | | 20 | | | | | 80 | | | | | 100 |
| 48 | | 40 | | | | 40 | 20 | | | | | 100 |

-continued

| Example | PVC | PAN | PMA | PAI | PBA | PS | PBD | CPMA-AN, 1:1 | CPBA-AI, 4:1 | CPS-BD, 1:1 | Polymer Comp. Total (%) |
|---|---|---|---|---|---|---|---|---|---|---|---|
| 49 | 40 | | | | | 30 | 30 | | | | 100 |
| 50 | | | | 100 | | | | | | | 100 |
| 51 | | 4 | 10 | 5 | 20 | 36 | 25 | | | | 100 |
| 52 | 9 | 3 | 7 | 8 | 9 | 27 | 37 | | | | 100 |
| 53 | 8 | 2 | 15 | 5 | 15 | 20 | 35 | | | | 100 |
| 54 | 40 | | | | | 20 | 40 | | | | 100 |
| 55 | 30 | | | | | 40 | 30 | | | | 100 |
| 56 | 20 | | | | | 35 | 35 | 5 | 5 | | 100 |
| 57 | | 13 | | | | 45 | 42 | | | | 100 |
| 58 | | | 25 | | 25 | 25 | 25 | | | | 100 |
| 59 | 8 | 2 | 10 | 3 | 10 | 30 | 37 | | | | 100 |
| 60 | | | | | | 100 | | | | | 100 |
| 61 | | 3 | 4 | 3 | 8 | 55 | 27 | | | | 100 |
| 62 | 10 | | | | | 70 | 20 | | | | 100 |
| 63 | | | 15 | | 28 | 28 | 29 | | | | 100 |
| 64 | | 10 | | | | 45 | 45 | | | | 100 |
| 65 | | | | | | 90 | 10 | | | | 100 |
| 66 | | 1 | 6 | 3 | 12 | 47 | 31 | | | | 100 |
| 67 | | | 5 | | 33 | 33 | 29 | | | | 100 |
| 68 | | | | | | 80 | 20 | | | | 100 |
| 69 | | | | | | 75 | 25 | | | | 100 |
| 70 | | 1 | | | | 60 | 39 | | | | 100 |
| 71 | | | | | | 35 | 55 | 5 | 5 | | 100 |
| 72 | | | | | | 60 | 40 | | | | 100 |
| 73 | | | | | | 50 | 50 | | | | 100 |
| 74 | | | | | | 40 | 60 | | | | 100 |
| 75 | | | | | | 25 | 75 | | | | 100 |
| 76 | | | | | | | 100 | | | | 100 |
| 77 | 10 | 3 | 14 | 14 | 11 | 17 | 14 | 3 | 8 | 6 | 100 |
| 78 | 10 | 3 | 19 | 3 | 15 | 18 | 14 | 3 | 3 | 12 | 100 |
| 79 | 15 | 3 | 6 | 3 | 5 | 25 | 20 | 3 | 4 | 16 | 100 |
| 80 | 5 | 3 | 2 | 3 | 12 | 45 | 16 | 3 | 3 | 8 | 100 |
| | PVC | PAN | PMA | PAI | PBA | PS | PBD | CPMA-AN, 1:1 | CPBA-AI, 4:1 | CPS-BD, 1:1 | |

For example, the table above provides an example 1 is a composition that includes 100% PAI; example 2 is a composition that includes 90% PAI and 10% PS.

| | PVC | PAN | PMA | PAI | PBA | PS | PBD | CPMA-AN, 1:1 | CPBA-AI, 4:1 | CPS-BD, 1:1 | |
|---|---|---|---|---|---|---|---|---|---|---|---|
| 8 | 2 | 18 | 45 | 15 | 20 | | | | | | 100 |
| 10 | 25 | 14 | 36 | 10 | 15 | | | | | | 100 |
| 11 | 32 | 13 | 33 | 7 | 15 | | | | | | 100 |
| 15 | 34 | 2 | 60 | 2 | 2 | | | | | | 100 |
| 29 | 10 | 7 | 11 | 13 | 9 | 24 | 26 | | | | 100 |
| 37 | 10 | 5 | 10 | 10 | 10 | 25 | 30 | | | | 100 |
| 41 | 15 | 2 | 15 | 6 | 14 | 22 | 26 | | | | 100 |
| 43 | 15 | 2 | 15 | 5 | 15 | 20 | 28 | | | | 100 |
| 46 | 8 | 2 | 15 | 8 | 15 | 22 | 30 | | | | 100 |
| 52 | 9 | 3 | 7 | 8 | 9 | 27 | 37 | | | | 100 |
| 53 | 8 | 2 | 15 | 5 | 15 | 20 | 35 | | | | 100 |
| 59 | 8 | 2 | 10 | 3 | 10 | 30 | 37 | | | | 100 |
| 32 | 5 | 8 | 5 | 15 | 5 | 30 | 32 | | | | 100 |
| 36 | | 7 | 13 | 8 | 18 | 32 | 22 | | | | 100 |
| 51 | | 4 | 10 | 5 | 20 | 36 | 25 | | | | 100 |
| 61 | | 3 | 4 | 3 | 8 | 55 | 27 | | | | 100 |
| 66 | | 1 | 6 | 3 | 12 | 47 | 31 | | | | 100 |
| 58 | | | 25 | | 25 | 25 | 25 | | | | 100 |
| 63 | | | 15 | | 28 | 28 | 29 | | | | 100 |
| 67 | | | 5 | | 33 | 33 | 29 | | | | 100 |
| 45 | | | | 20 | 35 | 10 | 35 | | | | 100 |
| 14 | | | | 50 | | 25 | 25 | | | | 100 |
| 22 | | | | 40 | | 20 | 40 | | | | 100 |
| 44 | | | | 30 | | 15 | 55 | | | | 100 |
| 20 | 20 | | 60 | | | 20 | | | | | 100 |
| 40 | | 25 | | | | 25 | 50 | | | | 100 |

-continued

| PVC | PAN | PMA | PAI | PBA | PS | PBD | CPMA-AN, 1:1 | CPBA-AI, 4:1 | CPS-BD, 1:1 |
|---|---|---|---|---|---|---|---|---|---|
| 42 | 20 |  |  |  | 40 | 40 |  |  | 100 |
| 57 | 13 |  |  |  | 45 | 42 |  |  | 100 |
| 64 | 10 |  |  |  | 45 | 45 |  |  | 100 |
| 48 | 40 |  |  |  | 40 | 20 |  |  | 100 |
| 49 | 40 |  |  |  | 30 | 30 |  |  | 100 |
| 54 | 40 |  |  |  | 20 | 40 |  |  | 100 |
| 55 | 30 |  |  |  | 40 | 30 |  |  | 100 |
| 62 | 10 |  |  |  | 70 | 20 |  |  | 100 |

| PVC | PAN | PMA | PAI | PBA | PS | PBD | CPMA-AN, 1:1 | CPBA-AI, 4:1 | CPS-BD, 1:1 |
|---|---|---|---|---|---|---|---|---|---|
| 16 |  | 45 |  | 15 |  |  | 10 | 10 | 20 | 100 |
| 19 |  | 50 |  | 30 |  |  | 5 | 5 | 10 | 100 |
| 24 |  | 50 |  | 41 |  |  | 2 | 2 | 5 | 100 |
| 25 |  | 20 |  | 20 | 20 |  | 10 | 10 | 20 | 100 |
| 39 |  | 28 |  | 28 | 24 |  | 5 | 5 | 10 | 100 |
| 21 |  | 55 |  | 35 |  |  | 10 |  |  | 100 |
| 23 |  | 55 |  | 35 |  |  |  | 10 |  | 100 |
| 30 |  | 40 |  | 40 | 10 |  | 10 |  |  | 100 |
| 34 |  | 40 |  | 40 | 10 |  |  | 10 |  | 100 |
| 33 |  | 40 |  | 46 | 9 |  | 5 |  |  | 100 |
| 35 |  | 40 |  | 46 | 9 |  |  | 5 |  | 100 |
| 27 |  | 60 |  | 38 |  |  | 2 |  |  | 100 |
| 28 |  | 60 |  | 38 |  |  |  | 2 |  | 100 |
| 56 | 20 |  |  |  | 35 | 35 | 5 | 5 |  | 100 |
| PVC | PAN | PMA | PAI | PBA | PS | PBD | CPMA-AN, 1:1 | CPBA-AI, 4:1 | CPS-BD, 1:1 |

For example, one embodiment of the present invention provides a water/air contact medium for use in an evaporative cooler, comprising a corrugated fibrous sheet material comprising at least a top layer and a bottom layer in contact at one or more regions to form at least two channels between the top layer and the bottom layer for air and fluid flow; and a water insoluble thermoplastic compound that impregnates the corrugated fibrous sheet material. The water insoluble thermoplastic compound may have between 1-35 weight percent PVC; 1-20 weight percent PAN; 1-60 weight percent PMA; 1-20 weight percent PAI; and 2-25 weight percent PBA. For example, the composition may have about 2 weight percent PVC; 18 weight percent PAN; 45 weight percent PMA; 15 weight percent PAI; 20 weight percent PBA. The composition may have about 25 weight percent PVC; 14 weight percent PAN; 36 weight percent PMA; 10 weight percent PAI; 15 weight percent PBA. The composition may have about 32 weight percent PVC; 13 weight percent PAN; 33 weight percent PMA; 7 weight percent PAI; 15 weight percent PBA. The composition may have about 34 weight percent PVC; 2 weight percent PAN; 60 weight percent PMA; 2 weight percent PAI; 2 weight percent PBA. The composition may further have between 15-35 weight percent PS and between 20-40 weight percent PBD. The composition may have about 10 weight percent PVC; 7 weight percent PAN; 11 weight percent PMA; 13 weight percent PAI; 9 weight percent PBA; 24 weight percent PS and 26 weight percent PBD. The composition may have about 10 weight percent PVC; 5 weight percent PAN; 10 weight percent PMA; 10 weight percent PAI; 10 weight percent PBA; 25 weight percent PS and 30 weight percent PBD. The composition may have about 15 weight percent PVC; 2 weight percent PAN; 15 weight percent PMA; 6 weight percent PAI; 14 weight percent PBA; 22 weight percent PS and 26 weight percent PBD. The composition may have about 15 weight percent PVC; 2 weight percent PAN; 15 weight percent PMA; 5 weight percent PAI; 15 weight percent PBA; 20 weight percent PS and 28 weight percent PBD. The composition may have about 8 weight percent PVC; 2 weight percent PAN; 15 weight percent PMA; 8 weight percent PAI; 15 weight percent PBA; 22 weight percent PS and 30 weight percent PBD. The composition may have about 9 weight percent PVC; 3 weight percent PAN; 7 weight percent PMA; 8 weight percent PAI; 9 weight percent PBA; 27 weight percent PS and 37 weight percent PBD. The composition may have about 8 weight percent PVC; 2 weight percent PAN; 15 weight percent PMA; 5 weight percent PAI; 15 weight percent PBA; 20 weight percent PS and 35 weight percent PBD. The composition may have about 8 weight percent PVC; 2 weight percent PAN; 10 weight percent PMA; 3 weight percent PAI; 10 weight percent PBA; 30 weight percent PS and 37 weight percent PBD. The composition may have about 5 weight percent PVC; 8 weight percent PAN; 5 weight percent PMA; 15 weight percent PAI; 5 weight percent PBA; 30 weight percent PS and 32 weight percent PBD.

For example, another embodiment of the present invention provides a water/air contact medium for use in an evaporative cooler, comprising a corrugated fibrous sheet material comprising at least a top layer and a bottom layer in contact at one or more regions to form at least two channels between the top layer and the bottom layer for air and fluid flow; and a water insoluble thermoplastic compound that impregnates the corrugated fibrous sheet material. The water insoluble thermoplastic compound may have between 1-10 weight percent PAN; 5-15 weight percent PMA; 2-10 weight percent PAI; 5-20 weight percent PBA; 30-57 weight percent PS and 20-35 weight percent PBD. The composition may have about 7 weight percent PAN; 13 weight percent PMA; 8 weight percent PAI; 18 weight percent PBA; 32 weight percent PS and 22 weight percent PBD. The composition may have about 4 weight percent PAN; 10 weight percent PMA; 5 weight percent PAI; 20 weight percent PBA; 36 weight percent PS and 25 weight percent PBD. The composition may have about 3 weight percent PAN; 4 weight percent PMA; 3 weight percent PAI; 8 weight percent PBA; 55 weight percent PS and 27 weight percent PBD. The composition may have about 1 weight percent PAN; 6 weight percent PMA; 3 weight percent PAI; 12 weight percent PBA; 47 weight percent PS and 31 weight percent PBD. In the tables and the examples above the polymer composition is discussed as a water/air contact medium it is understood that that is not a limitation and the composition may have numerous other uses.

The invention has been described in several embodiments. It should be apparent to those skilled in the art that the invention is not limited to these embodiments, but is capable of being varied and modified without departing from the scope of the invention as set out in the attached claims.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A water/air contact medium for use in an evaporative cooler, comprising
   a corrugated fibrous sheet material comprising at least a top layer and a bottom layer in contact at one or more regions to form at least two channels between the top layer and the bottom layer for air and fluid flow; and
   a water insoluble thermoplastic composition that impregnates the corrugated fibrous sheet material, wherein the water insoluble thermoplastic composition comprises between 1-35 weight percent polyvinyl chloride; 1-20 weight percent polyacrylonitrile; 1-60 weight percent poly(methyl acrylate); 1-20 weight percent polyamide-imides; and 2-25 weight percent poly(butyl acrylate).

2. The water/air contact medium of claim 1, wherein the composition comprises about 2 weight percent polyvinyl chloride; 18 weight percent polyacrylonitrile; 45 weight percent poly(methyl acrylate); 15 weight percent polyamide-imides; and 20 weight percent poly(butyl acrylate).

3. The water/air contact medium of claim 1, wherein the composition comprises about 25 weight percent polyvinyl chloride; 14 weight percent polyacrylonitrile; 36 weight percent poly(methyl acrylate); 10 weight percent polyamide-imides; and 15 weight percent poly(butyl acrylate).

4. The water/air contact medium of claim 1, wherein the composition comprises about 32 weight percent polyvinyl chloride; 13 weight percent polyacrylonitrile; 33 weight percent poly(methyl acrylate); 7 weight percent polyamide-imides; and 15 weight percent poly(butyl acrylate).

5. The water/air contact medium of claim 1, wherein the composition comprises about 34 weight percent polyvinyl chloride; 2 weight percent polyacrylonitrile; 60 weight percent poly(methyl acrylate); 2 weight percent polyamide-imides; and 2 weight percent poly(butyl acrylate).

6. The water/air contact medium of claim 1, wherein the composition further comprises between 15-35 weight percent Polystyrene and between 20-40 weight percent polybutadiene.

7. The water/air contact medium of claim 6, wherein the composition comprises about 10 weight percent polyvinyl chloride; 7 weight percent polyacrylonitrile; 11 weight percent poly(methyl acrylate); 13 weight percent polyamide-imides; 9 weight percent poly(butyl acrylate); 24 weight percent polystyrene and 26 weight percent polybutadiene.

8. The water/air contact medium of claim 6, wherein the composition comprises about 10 weight percent polyvinyl chloride; 5 weight percent polyacrylonitrile; 10 weight percent poly(methyl acrylate); 10 weight percent polyamide-imides; 10 weight percent poly(butyl acrylate); 25 weight percent polystyrene and 30 weight percent polybutadiene.

9. The water/air contact medium of claim 6, wherein the composition comprises about 15 weight percent polyvinyl chloride; 2 weight percent polyacrylonitrile; 15 weight percent poly(methyl acrylate); 6 weight percent polyamide-imides; 14 weight percent poly(butyl acrylate); 22 weight percent polystyrene and 26 weight percent polybutadiene.

10. The water/air contact medium of claim 6, wherein the composition comprises about 15 weight percent polyvinyl chloride; 2 weight percent polyacrylonitrile; 15 weight percent poly(methyl acrylate); 5 weight percent polyamide-imides; 15 weight percent poly(butyl acrylate); 20 weight percent polystyrene and 28 weight percent polybutadiene.

11. The water/air contact medium of claim 6, wherein the composition comprises about 8 weight percent polyvinyl chloride; 2 weight percent polyacrylonitrile; 15 weight percent poly(methyl acrylate); 8 weight percent polyamide-imides; 15 weight percent poly(butyl acrylate); 22 weight percent polystyrene and 30 weight percent polybutadiene.

12. The water/air contact medium of claim 6, wherein the composition comprises about 9 weight percent polyvinyl chloride; 3 weight percent polyacrylonitrile; 7 weight percent poly(methyl acrylate); 8 weight percent polyamide-imides; 9 weight percent poly(butyl acrylate); 27 weight percent polystyrene and 37 weight percent polybutadiene.

13. The water/air contact medium of claim 6, wherein the composition comprises about 8 weight percent polyvinyl chloride; 2 weight percent polyacrylonitrile; 15 weight percent poly(methyl acrylate); 5 weight percent polyamide-imides; 15 weight percent poly(butyl acrylate); 20 weight percent polystyrene and 35 weight percent polybutadiene.

14. The water/air contact medium of claim 6, wherein the composition comprises about 8 weight percent polyvinyl chloride; 2 weight percent polyacrylonitrile; 10 weight percent poly(methyl acrylate); 3 weight percent polyamide-imides; 10 weight percent poly(butyl acrylate); 30 weight percent polystyrene and 37 weight percent polybutadiene.

15. The water/air contact medium of claim 6, wherein the composition comprises about 5 weight percent polyvinyl chloride; 8 weight percent polyacrylonitrile; 5 weight percent poly(methyl acrylate); 15 weight percent polyamide-imides; 5 weight percent poly(butyl acrylate); 30 weight percent polystyrene and 32 weight percent polybutadiene.

16. A water/air contact medium for use in an evaporative cooler, comprising
    a corrugated fibrous sheet material comprising at least a top layer and a bottom layer in contact at one or more regions to form at least two channels between the top layer and the bottom layer for air and fluid flow; and
    a water insoluble thermoplastic compound that impregnates the corrugated fibrous sheet material, wherein the water insoluble thermoplastic compound comprises between 1-10 weight percent polyacrylonitrile; 5-15 weight percent poly(methyl acrylate); 2-10 weight percent polyamide-imides; 5-20 weight percent poly(butyl acrylate); 30-57 weight percent polystyrene and 20-35 weight percent polybutadiene.

17. The water/air contact medium of claim 16, wherein the composition comprises about 7 weight percent polyacrylonitrile; 13 weight percent poly(methyl acrylate); 8 weight percent polyamide-imides; 18 weight percent poly(butyl acrylate); 32 weight percent polystyrene and 22 weight percent polybutadiene.

18. The water/air contact medium of claim 16, wherein the composition comprises about 4 weight percent polyacrylonitrile; 10 weight percent poly(methyl acrylate); 5 weight percent polyamide-imides; 20 weight percent poly(butyl acrylate); 36 weight percent polystyrene and 25 weight percent polybutadiene.

19. The water/air contact medium of claim 16, wherein the composition comprises about 3 weight percent polyacrylonitrile; 4 weight percent poly(methyl acrylate); 3 weight percent polyamide-imides; 8 weight percent poly(butyl acrylate); 55 weight percent polystyrene and 27 weight percent polybutadiene.

20. The water/air contact medium of claim 16, wherein the composition comprises about 1 weight percent polyacrylonitrile; 6 weight percent poly(methyl acrylate); 3 weight percent polyamide-imides; 12 weight percent poly(butyl acrylate); 47 weight percent polystyrene and 31 weight percent polybutadiene.

* * * * *